United States Patent [19]

Hörmann

[11] Patent Number: 4,888,531
[45] Date of Patent: Dec. 19, 1989

[54] VARIABLE DRIVE MECHANISM FOR THE PANEL OF A GATE OR SIMILAR STRUCTURE

[75] Inventor: Michael Hörmann, Westfalen, Fed. Rep. of Germany

[73] Assignee: Hörmann KG Antriebs- und Steuerungstechnik, Harsewinkel, Fed. Rep. of Germany

[21] Appl. No.: 151,498

[22] Filed: Feb. 2, 1988

[30] Foreign Application Priority Data

Feb. 12, 1987 [DE] Fed. Rep. of Germany ....... 3704417
Jan. 18, 1988 [DE] Fed. Rep. of Germany ... 8800517[U]

[51] Int. Cl.$^4$ .............................................. G05D 3/00
[52] U.S. Cl. ..................... 318/282; 318/467; 318/468
[58] Field of Search ............... 318/282, 283, 463, 464, 318/466, 467, 468, 469

[56] References Cited

U.S. PATENT DOCUMENTS

| | | | |
|---|---|---|---|
| 4,092,575 | 5/1978 | Ogishi et al. | 318/282 |
| 4,234,833 | 11/1980 | Barrett | 318/282 |
| 4,293,806 | 10/1981 | Kull et al. | 318/466 X |
| 4,364,003 | 12/1982 | Phipps | 318/468 X |
| 4,401,929 | 8/1983 | Odaka et al. | 318/266 X |
| 4,498,033 | 2/1985 | Aihara et al. | 318/265 X |
| 4,529,920 | 7/1985 | Yoshida et al. | 318/466 |
| 4,563,625 | 1/1986 | Kornbrekke et al. | 318/283 X |
| 4,565,954 | 1/1986 | Yamanishi et al. | 318/282 X |

Primary Examiner—Bentsu Ro
Attorney, Agent, or Firm—Max Fogiel

[57] ABSTRACT

Variable electrically motorized drive mechanism for gates or similar structure close-off devices that can be installed for the purpose of an assembly operation that is as heavy-duty as possible and without fine adjustments, for which purpose the gate is provided with controls that essentially comprise a position detector, a memory, and a reference-point indicator, the last of which is positioned between the gate-panel limiting positions and outside of any stop positions or defines a corresponding gate-panel reference-point position and synchronizes the position detector at each stroke such that the path that the panel is to travel along from the reference-point position into a particular desired position is dicated or monitored in accordance with a memory output that corresponds to the adjusted position. The system is accordingly continuously self-monitoring and can synchronize itself when the motor is started up again after a power outage and possibly manual operation of the gate.

21 Claims, 3 Drawing Sheets

VARIABLE DRIVE MECHANISM FOR THE PANEL OF A GATE OR SIMILAR STRUCTURE

BACKGROUND OF THE INVENTION

Gates of the type concerned in the present context are in particular overhead gates, although they may also be vertical roll-up gates, sliding gates, etc., have a motorized mechanism that drives a panel or similar structure back and forth along a particular path between two limiting positions, and operate with limit switches that stop, by means of a radio signal for example, the motor that is responsible for the motion of the panel as soon as the panel arrives in its prescribed limiting position.

The limit switches are mounted in the vicinity of the limiting positions actually assumed by the gate panel, with a switched component on the frame or track of the gate and a switching component on the panel. Switched components accordingly mounted near the bottom of the opening to be closed off by the gate and at the edge of the gateway are, however, subject to damage, especially in heavy-industrial applications. Since they are also more exposed to contamination and splashing, both mechanical limit switches and those activated for example by light barriers entail associated problems.

It is of particular significance that positioning the limit switches in the vicinity of the frame or track and activating them by means of the panel itself not only entails additional installation labor after the gate has been mounted but also and in particular demands alignment and adjustment that require a lot of time and effort on site and are not within the capabilities of the average installer, who is more accustomed to less skilled labor. The small volume of space ordinarily available also makes for problems.

Simulating the motion of the gate panel, exploiting, that is, a parameter that corresponds to that motion and is derived from its drive mechanism although greatly reduced in scale to rotate or displace a certain component to an extent that represents the actual measured path traveled by the panel, has been proposed. A simulating component of this type thus also travels between two limiting positions that correspond to those of the panel, at which points they activate switchgear that accordingly reproduce the limiting positions of the panel.

Although a simulator, which is preferably positioned in the vicinity of the drive mechanism or its controls, is protected from contamination, dirt, and moisture, it demands especially precise adjustment in relation to the panel once the gate has been installed to the extent for instance that the point at which the panel begins to move corresponds precisely with the point at which the displacement of the simulator commences. At the path-reduction ratios involved, even slight discrepancies will allow the panel to travel beyond its limiting position and collide against the end of its track or against other objects. What is called a zero match between the panel and the moving simulator component accordingly demands special care and sensitivity that is difficult to obtain in such a coarse operation as mounting a gate.

SUMMARY OF THE INVENTION

The object of the present invention is to create a drive mechanism for a gate with motor controls depending on the motion of the panel that is especially easy to install, reliable, and simple to adjust, even when the newly installed gate is operated for the first time.

The point of departure for the invention is the synchronization of a position detector that indicates the instantaneous position of the gate panel with the actual motion of the gate at least once along the path between its two limiting positions, thus allowing the position detector to be in error to a certain extent. A reference-point indicator is for this purpose activated while the panel is traveling through a specific but extensively freely selectable reference-point position between the two limiting positions or through one or more stop positions located between them, upon which the reference-point indicator releases a synchronization signal to the position detector, calibrating it at a particular value that can depend on the direction that the panel is traveling through the reference-point position in. A specific value that depends on the particular limiting position and stop position of the panel is then entered in a memory and dictates the value of the position detector at which the motor is stopped.

The position detector in one particularly preferred embodiment of the invention is a simple incremental counter that counts a simple sequence of pulses emitted as the panel moves, with the instantaneous count preferably released in the form of parallel information, especially a dual-coded signal, at an appropriate multipole output terminal. The memory is also preferably a digital circuit that just as simply matches the incremental counter in the position detector. Furthermore, the reference-point indicator is accordingly a digital component, a YES-NO switch or threshold switch in the simplest case or preferably one that operates on the principle of dual-coded parallel signal expressions when the signal processing is more complicated.

The three switching devices, specifically the reference-point indicator, the position detector, and the memory, can operate in conjunction in various ways as will now be described.

The position detector can be reset to a specific value, zero for example, by the reference-point indicator every time the panel travels through the reference-point position. As the panel continues to travel to the next prescribed stop position or limiting position in the same direction, the position detector will then be reset in accordance with the motion of the panel, and its count will in particular be subsequent prescribed stop position or limiting position to the memory. When the output of the position detector coincides with that of the memory, a current-supply control that switches off the motor will be activated. The reference-point indicator in this embodiment is especially simple because one and the same setting value is always released to the position detector. A comparator will on the other hand be needed in order to detect the coincidence between the output from the position detector and the memory value that represents the particular desired position.

When in another embodiment the gate panel travels through the reference-point position of the position detector, the reference-point indicator will enter in the memory a signal that represents the next prescribed stop position or limiting position along the direction of travel. With this stored value transferred to the position detector as a point of departure, the detector will continue to be supplied until it arrives at an "overflow" value, zero or the next decade etc. for example, upon which a signal obtained from the overflow will be exploited to activate the motor's current-supply controls.

In both cases the controls can be adjusted in the same way when the system is operated for the first time. The gate is installed finished on site, that is, and the reference-point position established somewhere between the two limiting positions and preferably outside of the stop position or positions if any. In the latter case the reference-point position is preferably established between the gate-closed position and the immediately adjacent stop position because it is to be expected that the panel will generally be moved back and forth between the two positions when the stop position is initiated and that it will be the exception for the panel to be lowered out of the gate-open limiting position into the stop position. The reference-point position will generally be established such that the panel will to the greatest extent possible travel through it during every phase of motion.

When it is impossible to predict what phase of motion the panel will be traveling through most often and/or when extreme precision is necessary, there can be two or more reference-point positions with as many reference-point indicators, the latter just in front of the stop position or limiting position that must be activated with particular precision.

Before the normal operating controls are activated for the first time by a third party the gate panel will be randomly positioned and the position detector, memory, and, in the case of a bistable system, the reference-point indicator as well will be in a state of indefinite readout. The actual state of the panel that is to be operated for the first time must accordingly be matched with that of the controls. The reference-point position is accordingly established between the limiting positions and outside of any stop positions as previously described herein. As will be described in detail later herein, this can be done by an appropriately locally determined positioning of the reference-point indicator on the frame or track of the gate etc. or within the scope of a panel-motion simulator. The panel is then moved manually with the assistance of a pressure sensor (dead man's operation) toward and beyond the reference-point position. The reference-point indicator, at least if it is monostable, simultaneously emits a synchronization signal to the position detector that sets it at a specific value, especially zero. As the gate continues to travel toward the next stop position or limiting position, the position detector is tripped and retained in the next desired position. The value then indicated at the output terminal of the position detector is entered by means of an input key into an address in the memory that is associated with the stop position or limiting position, and the value is retained constantly at that address. The panel is then shifted into the next stop position or limiting position and retained there, upon which the value of the position detector that corresponds to this position is transferred by means of another input switch to another address in the memory that is associated with the position. For the purpose of storing the stop position or limiting position on the other side of the reference-point position the gate panel is now shifted in the opposite direction beyond reference-point position, so that the position detector is reset to the prescribed value, preferably zero. As the panel continues to move, the next adjacent stop position or limiting position is activated and the resulting indicating value on the part of the position detector entered by means of an input key at an address provided for that position in the memory.

In an initial and preferred embodiment of the invention the position detector is compulsorily reset by the synchronization signal or by each synchronization signal to the prescribed value, especially zero, and varies its value in accordance with the distance traveled by the panel to the next stop position or limiting position. Constant comparison of the output of the position detector with the values stored in the memory results, once a prescribed stop position or the limiting position beyond the reference-point position has been attained, in coincidence between the output signals from the position detector and those from the associated memory address, activating current-supply controls that stop the motor. If the panel is shifted out of this position in the opposite direction, the output of the position detector can be continuously set back so that, in the case of a stop position located upstream of the reference-point position in this direction, the output of the position detector will coincide with that of the associated memory address. When this stop position is activated, the motor can be turned off again by appropriate activation of the current-supply controls. The position detector can similarly be disengaged in accordance with the motion of the panel beyond the reference-point position by compulsorily resetting the detector to the prescribed value, preferably zero, as the panel travels through the reference-point position. A negative value is of course also possible.

For a directionally dependent back-and-forth disengagement of the position detector of this type it is necessary to be able to detect the particular direction that the panel is traveling in. A pulse generator accordingly allows signals to be detected in accordance with the path or with the direction of rotation of the motor. Preferred for this purpose is a generator disk that is driven by the motor, especially its output shaft, and has two scanning tracks and at least two signal-generating structures that enclose different angles.

It is on the other hand also possible to disengage the position detector by summing up from a passage through the reference-point position independent of the direction of travel. If there is in this case a stop position between the reference-point position in the particular operating range, another memory output must be made available to provide for comparison the value summed up during the motion back to the reference-point position at the stop position because the panel that is shifted out beyond the stop position will sum up, when the direction is reversed, the distance between the stop position and the limiting position with reference to the information from the position detector.

Another possibility is to completely change the disengagement of the position detector as the panel travels through the reference-point position once the values for the limiting position or stop position have been entered to the extent that the value obtained from the memory address associated with the prescribed stop position or limiting position is entered in the position detector every time the panel travels through the reference-point position. The counter can then count back from this value to the prescribed value, preferably zero, as the gate panel travels into the desired position, generating a signal that activates the current-supply controls once the value or the zero is attained.

It must be ensured that restarting the gate-drive mechanism subsequent to a power failure, even a very brief outage, will not damage it. This can basically be done by designing the overall controls such that they will not lose their signal content when the power is interrupted. This approach is admittedly comparatively expensive, especially in relation to the position detector. It is also necessary to ensure that the panel is not shifted manually, by means of a hand chain for example, during a power outage into another position that does not correspond to the one indicated by the position detector. The memory in one especially preferred embodiment is accordingly a "non-volatile" switching mechanism, so that its contents will not change or get lost during the outage. The position detector on the other hand must be a "volatile" switching mechanism, so that the particular positional value will be erased when the power fails. The reference-point indicator, finally, will have a bistable switch component that will even during a power outage indicate which direction of the two the panel is traveling in from the reference-point position. This information from the bistable switch is utilized to ensure, once the system has been turned on again, that the panel can only travel toward the reference-point position and that, once it has traveled beyond the reference point, it will reset the position detector as previously described herein. This measure will re-establish the synchronization between the position of the panel and the output value of the position detector subsequent to a power failure.

When the power failure lasts longer and the panel has to be shifted by hand as is regularly provided for in practice, it is preferable to employ a bistable indicator-switch that will appropriately vary its state as the panel is shifted through the reference-point position by hand. This switch can be switched by muscle power and is preferably a magnetically activated bistable switch of the type described in greater detail later herein with reference to the drawing.

Depending on the design of this bistable switch for the reference-point indicator it is possible for no pulse to be emitted when the panel travels beyond the reference-point position in the direction in which the bistable switch has already been tripped. In this case the position of the panel is synchronized with the value emitted by the position detector and the limiting position or stop position if any is entered in such a way that the finally installed gate panel is initially shifted with a manually operated scanning switch (dead-man operation) in one direction and then in the other direction beyond the reference-point position. This measure will ensure that, at least when the panel travels past the reference-point position for the second time, the position detector will be reset to the prescribed value, especially zero, ensuring the aforesaid adjustment in accordance with first-time operation.

The reference-point indicator can be positioned where it will be directly activated by the panel, having for example a switched component that is mounted stationary on the frame of the gate, on the panel track, or in a similar location and activated by a switching component entrained along with the panel. It will accordingly be generally possible without any problem to mount the switching component and the switched component on the frame or track and on the panel at the factory before the gate is installed, eliminating the necessity for such labor while the gate is being installed. It is also possible, especially if the switch is magnetically activated, to provide a tolerance field, eliminating the need for any adjustments once the gate has been installed.

It is also possible to realize the reference-point indicator within the scope of a very down-scaled panel-motion simulator. The switched component will again be stationary in this version and the switching component mounted on a part that imitates the motion of the panel at a greatly reduced scale, the nut for instance of a spindle connected to the output terminal of a transmission positioned downstream of the motor. The actual position of the panel can be synchronized with that of the spindle nut that dictates the reference-point position once the gate has been installed by simply attaching the spindle nut, which can for this purpose be split in two axially, at an appropriate point where it travels along the spindle. The panel is then for example shifted, once it has been installed, into the gate-closed position with scanning switches (dead man's switches) and the nut secured to the spindle in such a way that, once the panel has been shifted out of the gate-closed position by means of the motorized drive mechanism, the spindle nut and the switching component will travel past the stationary switched component, dictating the reference-point position of the panel within the scope of the simulator. The rest of the adjustment process is like that previously described herein.

Depending on the design of the switch, especially if it is bistable, on the reference-point indicator, the switching point will migrate along the particular direction of travel in relation to the ideal precise reference-point position of the panel, resulting in a "hysteresis" dictated by the spatial delay on the part of the switch in relation to the direction of travel and causing for example the position detector to maintain a slightly higher value, a lower number of counts for example, as the panel moves into the gate-open limiting position once the indicator has been tripped than during the reverse motion out of the gate-open limiting position as far as the oppositely directed tripping of the indicator. If the previously described synchronization and storage are carried out when the system is operated for the first time, the hysteresis will have no effect if the particular position is arrived at by traveling beyond the reference-point position in one direction. This is the case at the limiting positions of the panel. The stop positions can basically be arrived at in either direction, so that in this case the hysteresis or directionally dependent delay on the part of the indicator-switch can lead to variations in the location of the gate panel in the stop position. This situation, however, is usually insignificant because the motion of the panel is not opposed by any mechanical resistance as it is when assuming a limiting position. This means accordingly that the stop positions can be provided with enough "play" around the desired value that the imprecision deriving from the hysteresis will have no effect. If on the other hand it is important for whatever reason for stop positions that are arrived at from either direction of travel to be especially precisely located, the delay on the part of the switch can be dictated by means of another memory and their value absolutely employed for purposes of correction to the extent that a stop position arrived at from both directions can be assumed precisely at one and the same position. The stop position can simultaneously be located with no problem within the spatial hysteresis range of such a hysteresis-subject reference-point indicator. The reference-point indicator will then be activated during motion along one and/or the other direction out of such an actually readjusted stop position.

BRIEF DESCRIPTION OF THE DRAWINGS

One embodiment of the invention will now be described with reference to the drawing, wherein.

DESCRIPTION OF THE PREFERRED EMBODIMENT

Figure 1:
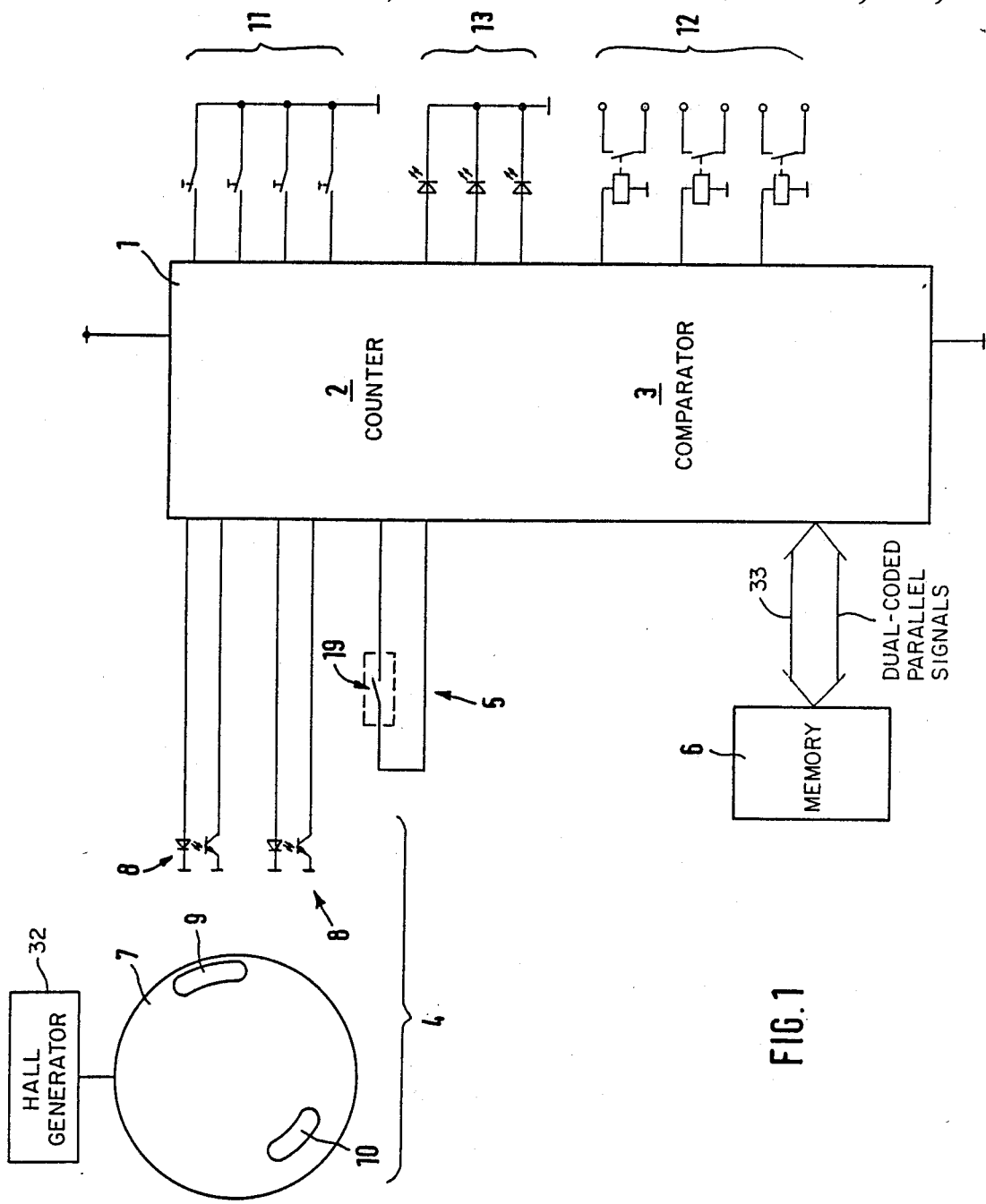
FIG. 1 is a block diagram illustrating the controls in accordance with an embodiment employed by way of example.

FIG. 1 is a schematic block diagram of a switching device 1 that comprises a counter 2 as part of a position detector and a comparator 3. Connected to switching device 1 are a pulse generator 4, the switch of a reference-point indicator 5, a memory 6, an input-switch device 11, power-supply controls 12, and a counter-setting display 13. Switching device 1 has additional connections and switchgear in accordance with the particular functions of the aforesaid individual circuit groups.

The pulse generator 4 in the illustrated embodiment comprises a generator disk 7 that is rotationally connected to the driveshaft of a motor in a way that is not illustrated. Mounted stationary next to the generator are two scanning devices 8 in the form of light barriers aimed in an unillustrated way at radially different circumferential tracks on generator disk 7. One of the two scanning devices 8 diametrically opposite the axis of rotation of generator disk 7 is aimed at a radially farther out track containing a slot 9 that curves along the track, and the other scanning device is aimed at a radially farther in track containing a slot 10. Slots 9 and 10 are not diametrically opposite and accordingly enclose a more acute angle in one circumferential direction than they do in the other. Whenever the slot 9 on rotating generator disk 7 arrives at the light barrier of one of the scanning devices 8, one pulse per rotation is released. Since the speed of the shaft corresponds to the length of the path traveled by the panel of the gate, the number of pulses that are emitted by slots 9 and/or 10 in conjunction with scanning devices 8 as generator disk 7 rotates and that repeatedly trip the counter 2 in the position detector represents a measure of how far the panel has traveled. Since slots 9 and 10 are not diametrically opposite each other, the interval between a pulse generated by slot 9 and one generated by slot 10 will be shorter in one direction than in the other. It is accordingly possible to determine what direction the motor is rotating in and hence what direction the panel is moving in by means of pulse generator 4.

A preferred embodiment of reference-point indicator 5, only the switch of which is illustrated in FIG. 1, will now be described in greater detail with reference to FIG. 2. One section of the area of a frame 14 that is to be mounted in an opening in a wall is illustrated along with part of the edge of the panel 15 of a gate that is also only partly illustrated and that is to be mounted in an unillustrated way such that it can slide back and forth on guide rollers or similar structures in also unillustrated tracks secured to the frame.

A switched component mounted on frame 14 comprises a permanent magnet 16 that pivots on an axis 17 more or less within a plane that parallels the panel as it travels by it. Magnet 16 is polarized in a direction diametrical in relation to axis 17 with one pole in the magnet's pivoting range pointing toward panel 15 and the reciprocal pole within the limited pivoting range of panel 15. Mounted on panel 15 is a switching magnet 18 in the form of another permanent magnet with one pole pointing away from frame 14 and its reciprocal pole toward the frame. The switching magnet 18 mounted stationary on panel 15 passes magnet 16 as the panel travels through the reference-point position defined by the position in space of the switching device in relation to magnet 16 and switching magnet 18 with its reciprocal pole exerting magnetic attraction on the pole of magnet 16. With the position of the magnets in FIG. 2 as a point of departure and with the panel traveling in the direction indicated by the arrow pointing away from switching magnet 18, switching magnet 18 will as it approaches magnet 16 exert an increasing more powerful attraction, pivoting the magnet on its axis 17 as it passes by.

The switching device in reference-point indicator 5 is bistable as will now be described. The reciprocal pole of magnet 16, the pole that faces away from panel 15 points, in the illustrated pivoted state, toward a switch 19 that is maintained activated in an unillustrated way while magnet 16 is in this position. As long accordingly as magnet 16 remains in the pivoted position illustrated in FIG. 2, resting against a stop 21, switch 19 will remain active whether open or closed. As switching magnet 18 passes by in the direction indicated by the arrow in FIG. 2, magnet 16 pivots on axis 17 and arrives from its position against stop 21 in its other limiting position against another stop 22. Outside of the arc described by the reciprocal-pole end of magnet 16 and at the midpoint between stops 21 and 22, another and small permanent magnet 20 is mounted stationary on the frame of the gate to stabilize magnet 16 in one or the other pivoted position Stabilizing magnet 20 is positioned with its reciprocal pole pointing toward the identically polarized reciprocal pole of permanent magnet 16, resulting in a magnetic repulsion between the stationary stabilizing magnet 20 and the pivoting permanent magnet 16, which is accordingly retained by the former in one of its two limiting positions. Stabilizing magnet 20, due to its size and position, does not act as powerfully on permanent magnet 16 as does switching magnet 18, which, as it passes magnet 16, can entrain it against the repulsion of stabilizing magnet 20. As soon as permanent magnet 16 has exceeded the midpoint in its orientation toward stabilizing magnet 20, the latter, in conjunction with the farther displaced switching magnet 18, shifts it into the associated limiting position against stop 21 or 22. When it is resting against stop 21, switch 19 is activated and, when it is resting against stop 22, switch 19 is disengaged. Thus, every time permanent magnet 16 pivots from one limiting position into the other, switch 19 is tripped, an event that is evaluated as a signal for governing counter 2 in the position detector, compulsorily zeroing the counter in the present example, whether the switch is tripped from the activated into the deactivated or vice versa.

This embodiment is started up for the first time and operated in accordance with the basic procedure already described herein. When the system is started up for the first time it is possible for the bistable reference-point indicator to be in the position that it is intended to be in when the panel travels past the reference-point position for the first time. With reference to FIG. 2, accordingly, permanent magnet 16 might not be in the illustrated limiting position but in the other limiting position, resting against stop 22, while switching magnet 18 moves in the direction indicated by the arrow. Switch 19 would accordingly not be tripped during this preliminary stage in the present embodiment, and no synchronization pulse would be generated for zeroing counter 2. For this reason the panel is basically shifted up to and beyond the reference-point position with a scanning generator, stopped, and shifted beyond the reference-point position in the opposite direction again when the system is started up for the first time because the reference-point indicator will in any case be activated at least as soon as the panel travels through the reference-point position for the second time, meaning in the present embodiment that permanent magnet 16 will pivot and switch 19 will be tripped from one state into the other. This measure ensures that counter will be zeroed, so that, as the panel continues to travel, the distance-dependent pulses generated by pulse are disengaged will continue to be counted. Once the next stop position or limiting position is arrived at, a switch in input-switch device 11 that is associated with that position will be activated, transferring the counter output to an address in memory 6. As soon as the panel travels through the reference-point position in the opposite direction, the counter is re-zeroed due to the activation of the switch 19 in reference-point indicator 5 and, as the panel continues to travel, the distance-dependent pulses will advance the counter as previously described herein until the next stop position or limiting position in that direction is arrived at, upon which the associated switch in input-switch device 11 will be activated and the counter output will be entered at an address in memory 6 that corresponds to that position. The output signals from the counter occur in the form of a dual-coded signal in several parallel lines, and input-switch device 11 enters them in the memory in parallel and in that form.

It is accordingly especially simple to start up the gate system for the first time in that the gate only has to be shifted into the separate positions in a scanning operation (dead-center switch), upon which the switch that is associated with that position in the input-switch device is activated. It is only necessary to make sure that the reference-point position is traveled through in one direction and then in the other direction. As soon as all the positions have been traveled through and the associated counter outputs entered in the memory, the gate will be ready to operate. An appropriate keyboard or radio signal is employed to turn on the drive mechanism and determine what position the panel is to be shifted into. This turns on the motor, and the counter simultaneously begins to determine every position of the panel as it moves. Providing the target position dictates the corresponding memory address, and a comparator constantly monitors the output signal from that address along with that of the counter. When the two outputs coincide, the comparator will release an output signal to power-supply controls 12, which interrupts the current to the motor and optionally releases further displays etc.

Counter-setting display 13 can display the state of the counter, simplifying its supervision, along with the position, etc.

Since the present drive mechanism and controls depend on external power, measures must be taken to prevent malfunction on the part of the gate when the power fails and is restored. There are two standards to be kept in mind in the event of a power failure. On the one hand, the power failure can either be very brief or occur at night. In other words, it may not be noticed, in which case it must be ensured that the next time the drive mechanism is turned on the position of the panel will correspond with the value in the position detector. If, on the other hand, an outage occurs during which the gate panel has to be shifted manually, it must also be ensured that the position of the panel corresponds with the value in the position detector once power has been restored.

For this purpose initially the reference-point indicator is bistable, basically indicating whether the panel is with respect to its switching component, switching magnet 18, above or below the reference-point position. To ensure that this will occur even when there is a power failure and the gate is shifted into another position by hand, the reference-point indicator in the present embodiment is constructed out of permanent magnets, so that permanent magnet 16 will be triggered by the passage of switching magnet 18 even when there is no power. Thus, when power is restored, reference-point indicator will always reliably indicate the position of the panel. This information is utilized to ensure that the electric drive mechanism, now functioning again, can initially only move the panel toward and beyond the reference-point position. This in turn ensures that the counter in the position detector will again be properly synchronized with the position of the panel. The counter can basically be a non-volatile switch element, meaning that it will retain its count even in the absence of power. This advantage, however, would only be practical if the counter could be reset in accordance with the new panel position during a power outage and manual operation. This would of course be possible in an electric counter only if there is an auxiliary power source. This is why the counter in one especially preferred embodiment is constructed of simple circuitry that loses its information in the event of a power failure. The aforesaid necessity of shifting the panel only toward the reference-point position when power is restored ensures that the counter will retain the position it was in when first turned on due to activation of the reference-point indicator. It is accordingly necessary only to construct the memory out of non-volatile circuitry to allow reliable operation subsequent to a power failure.

Figure 2:
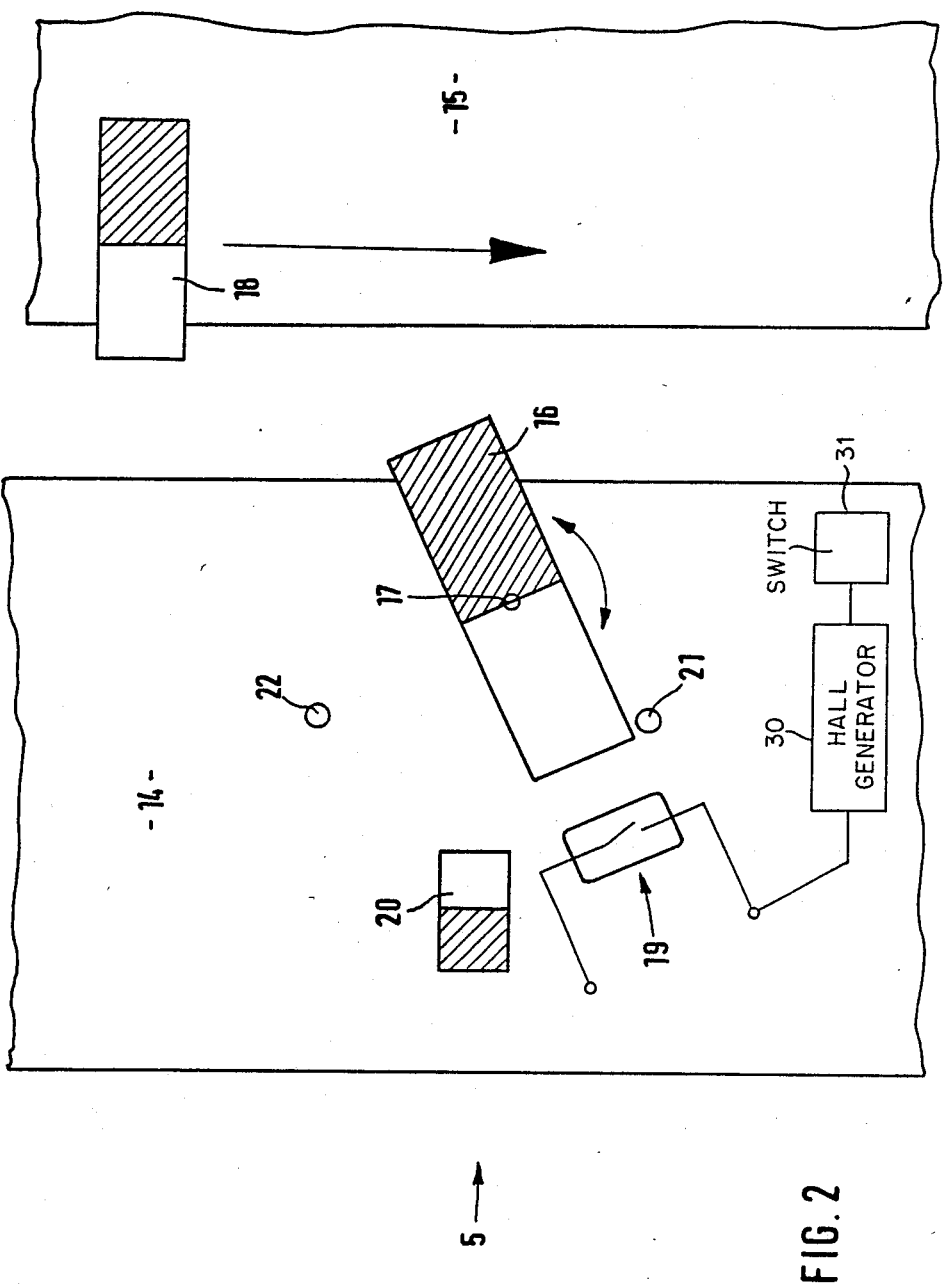
FIG. 2 is a schematic illustration of a magnetically activated bistable switch for a reference point indicator 5 in accordance with the same embodiment.
Figure 3:
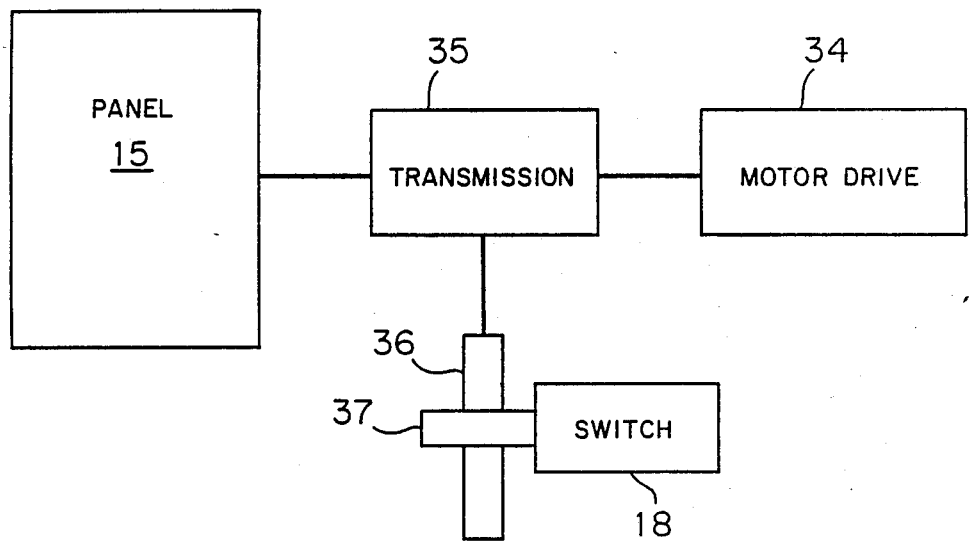
FIG. 3 is a schematic illustration showing the arrangement of a panel motion simulator.

The switch 19 illustrated, only schematically by the way, in FIG. 2 can for example be a reed contact of the commercially available magnetically activated type. Stabilizing magnet 20 could of course also be replaced with another type of magnetic system, with two small magnets for instance, each associated with one of the two stops and exerting magnetic force on permanent magnet 16 in such a way as to attract it into one of its two limiting positions.

The generator disk 7 has one or more magnetic regions distributed around its circumference and emits pulses that switch off a magnetically sensitive scanning device, a Hall generator 32 for example, as the disk rotates.

The pulse generator 4 has two signal tracks 9, 10 to allow different signals to be detected as the disk 7 rotates.

The input-switch device 11, the memory 6, the counter 2, the position detector 2, 4 and the comparator 3 may operate by transmitting dual coded parallel signals 33.

The bistable switch 19 in the indicator 5 has a Hall generator 30 and a switching device 31 that is triggered by it.

The reference-point indicator 5 is part of a panel-motion simulator that reproduces, at a greatly reduced scale, the motion of the panel along its path between the limiting positions. A switching component is provided that depends on the distance travelled and passes a stationary switched component as the panel travels, due for example to a spindle 36 that is mechanically coupled to the motorized drive mechanism, especially to the output shaft of a transmission 35 downstream of a motor 34. The spindle 36 drives along a straight line, a spindle nut 37 that the switching component 18 is mounted on.

I claim:

1. An arrangement for controlling a drive mechanism with a driving motor for moving a gate back and forth between two limiting positions and selectively through at least one stop position along a predetermined path, comprising: switching means for determining when a predetermined limiting position or stop position is being approached and emitting signals to switch off operating power to said motor; at least one reference-point detector for generating a synchronization signal when said gate travels through a predetermined reference-point position between said limiting positions; memory means for accepting, storing, and emitting data of said limiting positions and data of said selectively at least one stop position; and a position detector for supplying a value representing every actual position traveled through by said gate, said position detector receiving a positional-value readjustment dependent on said synchronization signal, said position detector releasing an output signal for switching off the operating power to said motor dependent on the direction the reference-point position is traveled through according to the predetermined limiting position or the stop position of said gate along said direction and selectively determined by a related output from said memory means once said gate arrives at said reference-point position.

2. An arrangement as defined in claim 1, wherein said reference-point detector, said memory means, and said position detector comprise digital switch means.

3. An arrangement as defined in claim 2, wherein said position detector has a pulse counter with a counting input terminal connected to a pulse generator deriving pulses from rotation of said drive mechanism.

4. An arrangement as defined in claim 3, wherein said pulse generator has a generator disk, said motor having a drive shaft connected to said generator disk, said generator disk rotating with said drive shaft; said pulse generator further comprising a scanning means operatively connected with said generator disk, said scanning means having a physical informational state altered digitally at least once for every revolution of said generator disk.

5. An arrangement as defined in claim 4, wherein said generator disk is perforated, said scanning means having a light barrier, said generator disk having a circumference located within range of said barrier.

6. An arrangement as defined in claim 5, wherein said generator disk has two slots extending radially along different circumferential tracks, each slot having a respective light barrier switch, each slot having a switching distance along the respective circumferential track that encloses an angle different from the corresponding angle of the other slot.

7. An arrangement as defined in claim 4, wherein said generator disk has a circumference and at least one magnetic region around said circumference, said magnetic region emitting pulses for switching off a magnetically sensitive Hall generator as said generator disk rotates.

8. An arrangement as defined in claim 4, wherein said generator disk has a circumference and at least two signal-emitting marks distributed around said circumference, said two signal-emitting marks having a circumferential distance therebetween, said circumferential distance being shorter in one direction of rotation of said disk than in the other direction of rotation.

9. An arrangement as defined in claim 4, wherein said pulse generator has two signal tracks for allowing different signals to be detected as said generator disk rotates.

10. An arrangement as defined in claim 1, wherein said reference-point detector comprises a bistable switch and said memory means comprises non-volatile electrical means, so that depending on a switching state of said reference-point detector, said gate being shiftable out of a current position only toward said reference-point position when said drive mechanism is operative and a corresponding adjustment of said position detector is absent.

11. An arrangement as defined in claim 10, wherein said bistable switch has a Hall generator and switching means triggered by said Hall generator.

12. An arrangement as defined in claim 1, further including power supply control means connected to said driving motor; comparator means connected to an output of said position detector and an output of said memory means for triggering said power supply control means when the output of said position detector coincides with the output of said memory means.

13. An arrangement as defined in claim 1, wherein said sychronization signal always sets said position detector to a predetermined reference-point value.

14. An arrangement as defined in claim 1, wherein said synchronization signal sets said position detector to a value determined by an output of said memory means corresponding to the predetermined limiting position or the stop position said gate traveling to said limiting position or said stop position when travelling through said reference-point position, so that said position detector will emit the output signal for controlling the operating power of said motor when said predetermined limiting position said stop position has been arrived at.

15. An arrangement as defined in claim 1, including input-switch means for providing a limiting position value to said memory means when said arrangement is started initially and said gate is shifted by hand and monitored by human senses into each limiting position and said selectively at least one stop position, said input switch means allowing a value corresponding to an intended position to which said gate has been shifted to be entered manually by activating a switch into an address in said memory means, said value being assigned from thereon to said intended position in accordance with an output of said position detector.

16. An arrangement as defined in claim 15, wherein said input-switch means, said memory means, and said position detector transmit dual-coded parallel signals.

17. An arrangement as defined in claim 1, wherein said reference-point position is in vicinity of a predetermined location when said gate is closed; said predetermined location being at leas one stop position and one adjacent stop position along a direction that said gate travels when said gate is opened.

18. An arrangement as defined in claim 1, wherein said reference-point detector has switching means travelling along with said gate and stationary switching means mounted on a frame of said gate.

19. An arrangement as defined in claim 1, including a motion simulator having said reference-point detector as a part thereof and having a movable panel; said simulator reproducing at a substantially reduced scale the motion of said panel along a path between limiting positions; said simulator having switching means depending on distance travelling and passing a stationary switch as said panel travels; transmission means connected between said driving motor and said panel; spindle means connected to an output shaft of said transmission means; a spindle nut driven along a straight line by said spindle means and mounting said switching means depending on distance travelled and passing said stationary switch.

20. An arrangement as defined in claim 1, including additional reference-point detectors associated with a plurality of reference-point positions at different defined locations along the path of motion of said gate.

21. An arrangement for controlling a drive mechanism with a driving motor for moving a gate back and forth between two limiting positions and selectively through at least one stop position along a predetermined path, comprising: switching means for determining when a predetermined limiting position or stop position is being approached and emitting signals to switch off operating power to said motor; at least one reference-point detector for generating a sychronization signal when said gate travels through a predetermined reference-point position between said limiting positions; memory means for accepting, storing, and emitting data of said limiting positions and data of said selectively at least one stop position; and a position detector for supplying a value representing every actual position traveled through by said gate said position detector receiving a positional-value readjustment dependent on said sychronization signal, said position detector releasing an output signal for switching off the operating power to said motor dependent on the direction the reference-point position is traveled through according to the predetermined limiting position or the stop position of said gate along said direction and selectively determining by a related output from said memory means once said gate arrives at said reference-point position; said reference-point detector comprising a bistable switch and said memory means comprising non-volatile electrical means, so that depending on a switch state of said reference-point detector, said gate being shiftable out of a current position only toward said reference-point position when said drive mechanism is operative and a corresponding adjustment of said position detector is absent; a pivoting permanent magnet with a stationary pivot polarized perpendicular to an axis of rotation of said pivot; a switching magnet comprising a further permanent magnet and following the motion of said gate, so that as said gate travels through said reference-point position, said switching magnet forcing magnetically said pivoting permanent moving out of one pivoted limiting position and into another pivoted position; a stationary stabilizing magnet retaining magnetically said pivoting permanent magnet in whatever limiting position occupied by said pivoting magnet with reduced magnetic strength; stationary magnetically activated switching means with a reed contract triggered by said pivoting magnet when said pivoting magnet is in one limiting position, said magnetically activated switching means being not triggered when said pivoting magnet is in another limiting position.

* * * * *